US012434488B2

(12) United States Patent
Seguchi et al.

(10) Patent No.: US 12,434,488 B2
(45) Date of Patent: Oct. 7, 2025

(54) METHODS FOR PRINTING AND WRAPPING

(71) Applicant: SEIKO EPSON CORPORATION, Tokyo (JP)

(72) Inventors: Kenichi Seguchi, Okaya (JP); Chigusa Sato, Matsumoto (JP); Emi Takeuchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 172 days.

(21) Appl. No.: 18/307,939

(22) Filed: Apr. 27, 2023

(65) Prior Publication Data

US 2023/0347663 A1 Nov. 2, 2023

(30) Foreign Application Priority Data

Apr. 28, 2022 (JP) ................................ 2022-074404

(51) Int. Cl.

*B41J 11/00* (2006.01)
*B41J 2/175* (2006.01)
*B41J 3/407* (2006.01)

(52) U.S. Cl.

CPC ........... *B41J 11/0021* (2021.01); *B41J 2/175* (2013.01); *B41J 3/407* (2013.01)

(58) Field of Classification Search

CPC ........ B41J 11/0021; B41J 2/175; B41J 3/407; B41M 5/0047; B41M 5/0064; B41M 7/0081; B65B 53/02; B65B 61/025

USPC .......................................................... 347/100

See application file for complete search history.

(56) References Cited

U.S. PATENT DOCUMENTS

2004/0038026 A1* 2/2004 Li .......................... B32B 15/08 428/354
2004/0052967 A1* 3/2004 Takabayashi ........ B41M 7/0081 522/100
2010/0013899 A1* 1/2010 Matsumura ........ C08G 59/1438 347/100
2013/0010039 A1* 1/2013 Kida .................... C09D 11/322 522/167
2013/0022797 A1* 1/2013 Lorence .................. B32B 27/08 428/343

FOREIGN PATENT DOCUMENTS

JP 2003-285540 A 10/2003

* cited by examiner

*Primary Examiner* — Jason S Uhlenhake
*Assistant Examiner* — Alexander D Shenderov
(74) *Attorney, Agent, or Firm* — Harness, Dickey & Pierce, P.L.C.

(57) ABSTRACT

A printing method is used for printing a shrink film with radiation-curable ink. The printing method includes forming an image on the shrink film with a first radiation-curable ink by an ink jet method, and forming a fixing pattern by applying a second radiation-curable ink onto a surface of the shrink film that is to come into contact with an object to be wrapped with the shrink film.

6 Claims, 4 Drawing Sheets

METHODS FOR PRINTING AND WRAPPING

The present application is based on, and claims priority from JP Application Serial Number 2022-074404, filed Apr. 28, 2022, the disclosure of which is hereby incorporated by reference herein in its entirety.

BACKGROUND

1. Technical Field

The present disclosure relates to methods for printing and wrapping.

2. Related Art

A type of film is often attached to, for example, resin or glass containers of products such as beverages, foods, seasonings, and cosmetics when such products are packaged. Such film is attached to a container by being shrunk in such a manner as to tighten the container and is, therefore, called shrinkable film (or shrink film). Many shrink films are printed according to the product, typically before being attached to the container, that is, before being shrunk.

For example, JP-A-2003-285540 discloses that thermally shrinkable film is subjected to ink jet printing with a radiation-curable ink containing a coloring material, a radically polymerizable compound, and a polymerization initiator and is then irradiated with radiation, such as ultraviolet light, to cure the ink.

For attaching shrink film to a container or any other object, the shrink film is put around a container or another object and heated to shrink along the periphery of the container. In some cases, for shrinking, the shrink film is aligned with the object container with a jig to prevent misalignment between them.

Printing with radiation-curable ink jet ink is desired for shrink film used for small-lot, high-mix product containers. Unfortunately, in this case, a jig must be set for the type of product according to the size and shape of the container and shrink film. Furthermore, shrinking the film requires the time and effort to adjust the positions of the container, the shrink film, and the jig.

SUMMARY

Accordingly, an aspect of the present disclosure provides a printing method for printing a shrink film with radiation-curable ink. The printing method includes forming an image on a shrink film with a first radiation-curable ink by an ink jet method, and forming a fixing pattern by applying a second radiation-curable ink onto a surface of the shrink film that is to come into contact with an object to be wrapped with the shrink film.

In another aspect of the present disclosure, a wrapping method including wrapping the object with the shrink film printed by the above-described printing method is provided.

DESCRIPTION OF EXEMPLARY EMBODIMENTS

Figure 1:
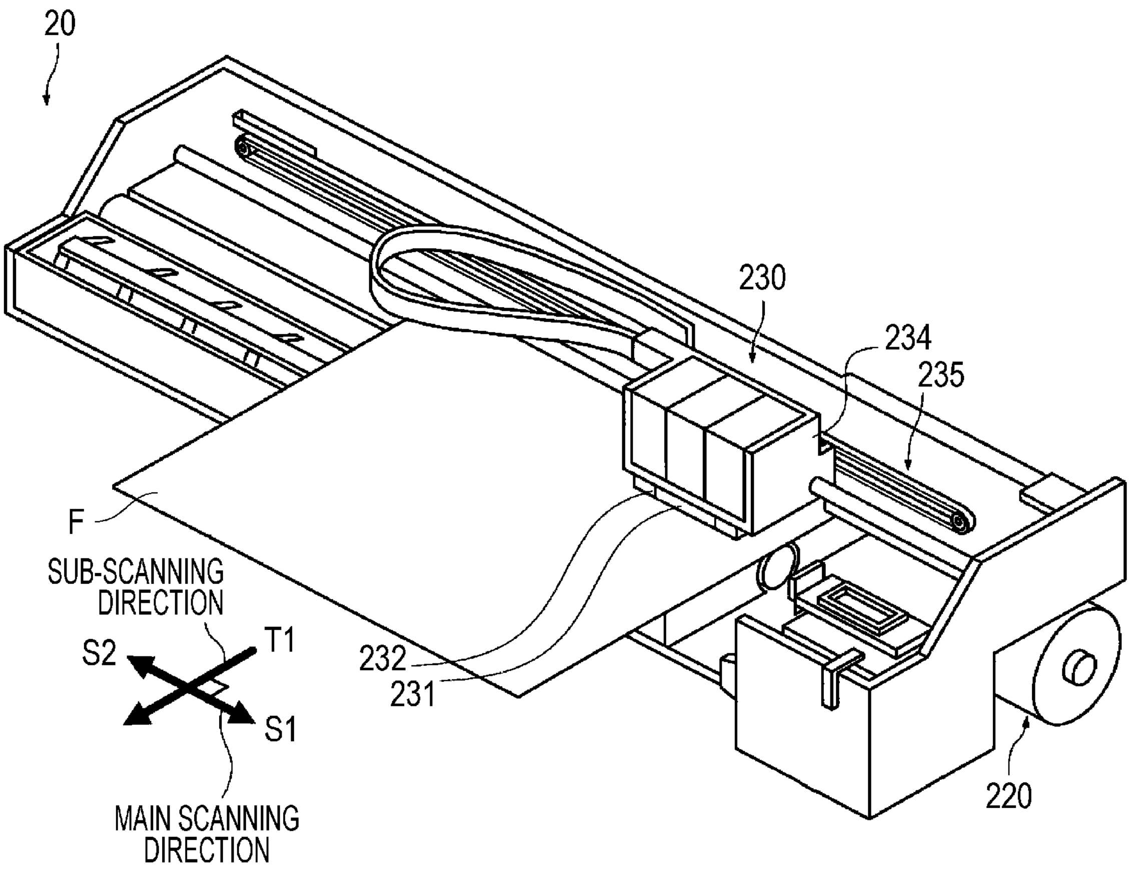
FIG. 1 is a perspective view of a serial ink jet apparatus.

Some embodiments of the present disclosure will now be described. The following embodiments are exemplary implementations of the present disclosure. The implementations of the concept of the present disclosure are not limited to the following embodiments, and various modifications may be made within the scope and spirit of the disclosure. Not all the components disclosed in the following embodiments are necessarily essential for implementing the concept of the disclosure.

1. Printing Method

The printing method disclosed herein is intended to print shrink film with radiation-curable ink. The printing method includes forming an image on a shrink film with a first radiation-curable ink by an ink jet method, and forming a fixing pattern by applying a second radiation-curable ink onto a surface of the shrink film that is to come into contact with an object to be wrapped with the shrink film.

1.1. Shrink Film and Object to be Wrapped

The shrink film may be, but is not limited to, a film that is shrunk 10% or more at least in a direction when heated, for example, to 80° C. In some embodiments, the shrink film is shrunk 15% or more, for example, 20% or more or 30% or more. The heating temperature for shrinking the shrink film is not particularly limited.

The degree of shrinkage of a shrink film when heated can be determined as described below. The degree of the shrinkage may be measured in any direction. In the present disclosure, the shrinkage at least in one direction that provides the largest shrinkage is within the above range. When an oriented film whose resin is oriented in a direction by stretching the film in the orientation direction is heated, the stress caused by the molecular orientation is released, and the film shrinks to the dimensions before stretching. The degree and the direction of shrinkage can be adjusted, for example, in a stretching step in the process of producing the shrink film, and the direction of shrinkage may be in, but is not limited to, either the machine direction or the width direction or both.

$$\text{Shrinkage (\%)}=[(\text{length before shrinkage})-(\text{length after shrinkage})]/(\text{length before shrinkage})$$

Examples of the resin that forms the shrink film include, but are not limited to, polyolefin resin, polyester resin, polystyrene resin, and polyvinyl chloride resin. For example, a shrink film may be formed of a polyester resin produced by condensation polymerization of a dicarboxylic acid component and a polyhydric alcohol component.

Examples of the dicarboxylic acid component include, but are not limited to, aromatic dicarboxylic acids and their salts, such as terephthalic acid, isophthalic acid, 1,4- or 2,6-naphthalenedicarboxylic acid, and sodium 5-sulfoisophthalate; dialkyl esters, diaryl esters, and other esterified derivatives of aromatic dicarboxylic acids; and aliphatic dicarboxylic acids, such as dimer acid, glutaric acid, adipic acid, sebacic acid, azelaic acid, oxalic acid, and succinic acid.

In addition to these, oxycarboxylic acids, such as p-oxybenzoic acid; and multivalent carboxylic acids, such as trimellitic anhydride and pyromellitic dianhydride may be used.

Examples of the polyhydric alcohol component include, but are not limited to, alkylene glycols, such as ethylene glycol, diethylene glycol, dimer diol, propylene glycol, triethylene glycol, 1,4-butanediol, neopentyl glycol, 1,3-cyclohexanedimethanol, 1,4-cyclohexanedimethanol, 1,6-hexanediol, 3-methyl-1,5-pentanediol, 2-methyl-1,5-pentanediol, 2,2-diethyl-1,3-propanediol, 1,9-nonanediol, and 1,10-decanediol; ethylene oxide adducts of bisphenol compounds or their derivatives; and trimethylolpropane, glycerin, pentaerythritol, polyoxytetramethylene glycol, and propylene glycol.

In addition to these, trimethylolethane, diglycerin, and other polyhydric alcohols may be used.

Examples of the polystyrene resin include, but are not limited to, polystyrene; poly(alkylstyrene), such as poly(p-, m-, or o-methylstyrene), poly(2,4-, 2,5-, 3,4- or 3,5-dimethylstyrene), and poly(p-tert-butylstyrene); poly(halogenated styrene), such as poly(p-, m-, or o-chlorostyrene), poly(p-, m-, or o-bromostyrene), poly(p-, m-, or o-fluorostyrene), and poly(o-methyl-p-fluorostyrene); poly(halogen-substituted alkylstyrene), such as poly(p-, m-, or o-chloromethylstyrene); poly(alkoxystyrene), such as poly(p-, m-, or o-methoxystyrene) and poly(p-, m-, or o-ethoxystyrene); poly(carboxyalkylstyrene), such as poly(p-, m-, or o-carboxymethylstyrene); poly(alkyl ether styrene), such as poly (p-vinylbenzyl propyl ether); poly(alkylsilylstyrene), such as poly(p-trimethylsilylstyrene); and poly(vinylbenzyldimethoxy phosphide).

The shrink film may contain a rubber component. Examples of the rubber component include, but are not limited to, rubber produced by partially or fully hydrogenating the butadiene moieties of a styrene-butadiene block copolymer, styrene-butadiene copolymer rubber, styrene-isoprene block copolymers, rubber produced by partially or fully hydrogenating the butadiene moieties of a styrene-isoprene block copolymer, methyl acrylate-butadiene-styrene copolymer rubber, and methyl methacrylate-alkyl acrylate-butadiene-styrene copolymer rubber.

In some embodiments, the shrink film is an oriented film. The oriented film may be uniaxially oriented or biaxially oriented. The orientation may be performed in, but not limited to, a method including a stretching step of stretching unstretched film 2.0 to 8.0 times, for example, 2.5 to 6.0 times, at a temperature of (Tg−20)° C. to (Tg+40)° C. in a direction in which the resulting film is made shrinkable. Tg is the glass transition temperature of the resin forming the shrink film. After the stretching step, the film may be heat-treated at a temperature of 50° C. to 110° C. while 0% to 15% stretched or relaxed.

Objects to which the shrink film will be attached include, but are not limited to, resin or glass containers, such as PET bottles, polyolefin bottles, and glass bottles. The number of such objects may be single or multiple. When the shrink film is attached to a plurality of objects, the objects may be bound together with the film. The shape of the object is not limited.

1.2. Image Formation

In image formation, one or more images are formed on the shrink film by an ink jet method using a first radiation-curable ink before the shrink film is shrunk.

1.2.1. First Radiation-Curable Ink

The first radiation-curable ink is cured by irradiation with radiation. The radiation may be ultraviolet light, an electron beam, infrared light, visible light, or X-rays. In some embodiments, ultraviolet light is used as the radiation because of the prevalence and availability of the radiation source and the materials suitable for curing with UV light.

The first radiation-curable ink contains, but not limited to, one or more polymerizable compounds, a polymerization initiator, a polymerization inhibitor, a sensitizer, a surfactant, a coloring material, and a dispersant, for example. The first radiation-curable ink does not necessarily contain all of these constituents and may contain only some of them. The constituents of the first radiation-curable ink will now be described.

(1) Polymerizable Compound

Compounds containing a polymerizable functional group are collectively referred to as polymerizable compounds. The polymerizable compounds used herein may include one or more monofunctional monomers with one polymerizable functional group in the molecule and one or more multi-functional monomers with a plurality of polymerizable functional groups in the molecule. A polymerizable compound may be used independently, or two or more polymerizable compounds may be used in combination.

The weighted average glass transition temperature of the polymerizable compounds in the first radiation-curable ink is 20° C. to 70° C. and, in some embodiments, may be 25° C. to 65° C., for example, 30° C. to 60° C. or 40° C. to 50° C. When the weighted average glass transition temperature is 20° C. or more, blocking resistance is improved. Also, when the weighted average glass transition temperature is 20° C. or more, the ink tends to exhibit improved curability. Additionally, when the weighted average glass transition temperature is 70° C. or less, shrink properties (unlikelihood that the shrinkage of cured ink coatings causes cracking or color irregularities) are improved.

The glass transition temperature of a polymerizable compound refers to the glass transition temperature of the homopolymer of the polymerizable compound. The weighted average glass transition temperature of the polymerizable compounds can be controlled by the glass transition temperatures of the homopolymers of the polymerizable compounds to be used and their proportions by mass.

It will now be explained how to calculate the weighted average glass transition temperature of the homopolymers of polymerizable compounds. The weighted average glass transition temperature of the homopolymers is represented by $Tg_{A11}$, the glass transition temperature of a polymerizable compound is represented by $Tg_N$, and the proportion by mass of the polymerizable compound is represented by $X_N$ (wt %). N is a variable, from 1 to the number of polymerizable compounds in the first radiation-curable ink, assigned in turn. For example, when three polymerizable compounds are used, the glass transition temperatures of their homopolymers are $Tg_1$, $Tg_2$, and $Tg_3$. The weighted average glass transition temperature $Tg_{A11}$ of homopolymers is the sum of the products of the glass transition temperature $Tg_N$ of the homopolymer of each polymerizable compound and the proportion $X_N$ by mass of the polymerizable compound. Thus, the following equation (1) holds:

$$Tg_{A11}=\Sigma(Tg_N \times X_N) \quad (1)$$

The glass transition temperature of the homopolymer of a polymerizable compound can be measured by differential scanning calorimetry (DSC) in accordance with JIS K 7121. More specifically, a sample prepared by polymerizing a monomer to the extent that its homopolymer exhibits a constant transition temperature is measured with a measurement apparatus, for example, Model DSC6220 manufactured by Seiko Instruments Inc.

The polymerizable compound content of the first radiation-curable ink may be 55% to 85% by mass relative to the total mass of the ink and is, in some embodiments, 60% to 80% by mass or 65% to 75% by mass. The ink containing such an amount of polymerizable compounds tends to improve blocking resistance and shrink properties and have improved curability.

(1-1) Monofunctional Monomers

Examples of the monofunctional monomers include, but are not limited to, nitrogen-containing monofunctional monomers, aromatic group-containing monofunctional monomers, and alicyclic structure-containing monofunctional monomers. Optionally, one or more of such monofunctional monomers may be replaced with other monofunctional monomers, or the monofunctional monomers may include other monofunctional monomers.

The proportion of monofunctional monomers in the first radiation-curable ink may be 30% by mass or more, for example, 40% by mass or more, relative to the total mass of the polymerizable compounds. The use of one or more monofunctional monomers in a proportion of 30% by mass or more tends to improve blocking resistance.

Exemplary monofunctional monomers will be cited below, but the monofunctional monomers used in the first radiation-curable ink are not limited to the following.

(1-1-1) Nitrogen-Containing Monofunctional Monomer

The polymerizable compounds may include a nitrogen-containing monofunctional monomer. The nitrogen-containing monofunctional monomer tends to improve the adhesion of the ink coating, thereby improving blocking resistance.

Examples of the nitrogen-containing monofunctional monomer include, but are not limited to, nitrogen-containing monofunctional vinyl monomers, such as N-vinylcaprolactam (n-VC), N-vinylformamide, N-vinylcarbazole, N-vinylacetamide, vinyl methyl oxazolidinone (VMOX), and N-vinylpyrrolidone; nitrogen-containing monofunctional acrylate monomers, such as acryloylmorpholine (ACMO); and monofunctional (meth)acrylamide monomers, such as (meth)acrylamide, N-(hydroxymethyl) (meth)acrylamide, diacetone acrylamide, N,N-dimethyl (meth)acrylamide, and dimethylaminoethyl acrylate benzyl chloride quaternary salt.

In an embodiment, the first radiation-curable ink may contain either a nitrogen-containing monofunctional vinyl monomer or a nitrogen-containing monofunctional acrylate monomer, particularly a monomer having a nitrogen-containing heterocyclic structure, such as vinyl methyl oxazolidinone, acryloylmorpholine, or N-vinylcaprolactam. In some embodiments, vinyl methyl oxazolidinone is contained. Such a nitrogen-containing monofunctional monomer reduces the viscosity of the ink. Consequently, the ejection consistency of the ink tends to be improved. Also, the ink containing such a nitrogen-containing monofunctional monomer tends to improve blocking resistance and shrink properties and exhibit improved curability. Furthermore, vinyl methyl oxazolidinone, which is a monomer with low viscosity at room temperature, tends to improve the ejection consistency of the ink.

The nitrogen-containing monofunctional monomer content of the first radiation-curable ink may be 15% to 45% by mass relative to the total mass of the ink and is, in some embodiments, 20% to 40% by mass or 25% to 35% by mass. The ink containing such an amount of nitrogen-containing monofunctional monomer tends to improve blocking resistance and shrink properties and exhibit improved curability.

(1-1-2) Aromatic Group-Containing Monofunctional Monomer

Examples of aromatic group-containing monofunctional monomers include, but are not limited to, phenoxyethyl (meth)acrylate, benzyl (meth)acrylate, alkoxylated 2-phenoxyethyl (meth)acrylate, ethoxylated nonylphenyl (meth)acrylate and other alkoxylated nonylphenyl (meth)acrylates, EO-modified p-cumylphenol (meth)acrylate, and 2-hydroxy-3-phenoxypropyl (meth)acrylate.

In an embodiment, phenoxyethyl (meth)acrylate or benzyl (meth)acrylate may be used. In some embodiments, phenoxyethyl (meth)acrylate, particularly phenoxyethyl acrylate (PEA), is used. Such an aromatic group-containing monofunctional monomer tends to increase the solubility of the polymerization initiator and improve the curability of the ink. In particular, the solubility of acylphosphine oxide-based polymerization initiators and thioxanthone-based polymerization initiators tends to be increased.

The aromatic group-containing monofunctional monomer content of the first radiation-curable ink may be 25% to 55% by mass relative to the total mass of the ink and is, in some embodiments, 30% to 50% by mass or 35% to 45% by mass. The ink containing such an amount of aromatic group-containing monofunctional monomer tends to improve blocking resistance and shrink properties and exhibit improved curability.

(1-1-3) Alicyclic Structure-Containing Monofunctional Monomer

Examples of alicyclic structure-containing monofunctional monomers include, but are not limited to, monocyclic hydrocarbon-containing monomers, such as tert-butylcyclohexanol (meth)acrylate (TBCHA), 3,3,5-trimethylcyclohexyl (meth)acrylate (TMCHA), and 1,4-dioxaspiro[4.5]dec-2-ylmethyl 2-(meth)acrylate; unsaturated polycyclic hydrocarbon-containing monomers, such as dicyclopentenyl (meth)acrylate and dicyclopentenyloxyethyl (meth)acrylate; and saturated polycyclic hydrocarbon-containing monomers, such as dicyclopentanyl (meth)acrylate and isobornyl (meth)acrylate (IBXA).

In some embodiments, isobornyl (meth)acrylate, tert-butylcyclohexanol acrylate, or trimethylcyclohexyl (meth)acrylate may be used, particularly isobornyl acrylate. The ink containing such an alicyclic structure-containing monofunctional monomer tends to improve blocking resistance and shrink properties and exhibit improved curability.

The alicyclic structure-containing monofunctional monomer content of the first radiation-curable ink may be 15% to 45% by mass relative to the total mass of the ink and is, in some embodiments, 20% to 40% by mass or 25% to 35% by mass. The ink containing such an amount of alicyclic structure-containing monofunctional monomer tends to improve blocking resistance and shrink properties and exhibit improved curability.

(1-2) Multifunctional Monomers

Examples of the multifunctional monomers include, but are not limited to, vinyl group-containing (meth)acrylates and other multifunctional (meth)acrylates. The multifunctional monomers are not limited to these compounds, and a plurality of multifunctional monomers may be used in combination.

The first radiation-curable ink may contain one or more multifunctional monomers in a proportion of 40% by mass or more, for example, 50% by mass or more or 60% by mass or more, relative to the total mass of the polymerizable compounds. The use of one or more multifunctional monomers in such a proportion improves blocking resistance. Exemplary multifunctional monomers will be cited below, but the multifunctional monomers used in the first radiation-curable ink are not limited to the following.

(1-2-1) Vinyl Group-Containing (Meth)Acrylate

Examples of vinyl group-containing (meth)acrylate include, but are not limited to, the compounds represented by the following formula (I):

$$H_2C{=}CR^1{-}CO{-}OR^2{-}O{-}CH{=}CH{-}R^3 \quad (I)$$

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

Such a vinyl group-containing (meth)acrylate tends to improve blocking resistance, shrink properties, or curability.

In formula (I), the divalent organic residue with 2 to 20 carbon atoms represented by $R^2$ may be a substituted or unsubstituted linear, branched, or cyclic alkylene group with 2 to 20 carbon atoms, a substituted or unsubstituted alkylene group with 2 to 20 carbon atoms having an oxygen atom of an ether bond and/or an ester bond in the molecular structure, or a substituted or unsubstituted divalent aromatic group with 6 to 11 carbon atoms. In some embodiments, $R^2$ may be an alkylene group with 2 to 6 carbon atoms, such as ethylene, n-propylene, isopropylene, or butylene; or an alkylene group with 2 to 9 carbon atoms having an oxygen atom of an ether bond in the molecular structure, such as oxyethylene, oxy n-propylene, oxyisopropylene, or oxybutylene. Particularly, the compound of formula (I) may be a compound having a glycol ether chain in which $R^2$ is an alkylene group with 2 to 9 carbon atoms having an oxygen atom of an ether bond in the molecular structure such as oxyethylene, oxy n-propylene, oxyisopropylene, or oxybutylene, from the viewpoint of reducing the viscosity of the ink and improving the curability of the ink.

In the above formula (I), the monovalent organic residue with 1 to 11 carbon atoms represented by $R^3$ may be a substituted or unsubstituted linear, branched, or cyclic alkyl group with 1 to 11 carbon atoms or a substituted or unsubstituted aromatic group with 6 to 11 carbon atoms. In some embodiments, $R^3$ is an alkyl group with 1 or 2 carbon atoms, that is, methyl or ethyl, or an aromatic group with 6 to 8 carbon atoms, such as phenyl or benzyl.

When the organic residues are substituted, the substituent may or may not contain one or more carbon atoms. For the substituent containing one or more carbon atoms, the carbon atoms of the substituent are counted in the number of carbon atoms of the organic residue. Examples of the substituent containing one or more carbon atoms include, but are not limited to, carboxy and alkoxy. Examples of the substituent not containing carbon atoms include, but are not limited to, hydroxy and halogens.

Examples of the compound of formula (I) include, but are not limited to, 2-vinyloxyethyl (meth)acrylate, 3-vinyloxypropyl (meth)acrylate, 1-methyl-2-vinyloxyethyl (meth) acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth) acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth) acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy) ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy) ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth) acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate. In some embodiments, 2-(2-vinyloxyethoxy)ethyl acrylate is used in view of the ease of balancing the curability and viscosity of the ink composition. In some embodiments, 2-(2-vinyloxyethoxy)ethyl acrylate is used in view of the ease of balancing the curability and the viscosity of the first radiation-curable ink. In the embodiments described herein, 2-(2-vinyloxyethoxy)ethyl acrylate may be abbreviated to VEEA.

The vinyl group-containing (meth)acrylate content of the first radiation-curable ink may be 1.0% to 10% by mass relative to the total mass of the ink and is, in some embodiments, 2.0% to 8.0% by mass or 4.0% to 6.0% by mass. The ink containing such an amount of vinyl group-containing (meth)acrylate tends to improve blocking resistance and shrink properties and exhibit improved curability.

(1-2-2) Multifunctional (Meth)Acrylate

Examples of multifunctional (meth)acrylates include bifunctional (meth)acrylates, such as dipropylene glycol di(meth)acrylate, diethylene glycol di(meth)acrylate, triethylene glycol di(meth)acrylate, tetraethylene glycol di(meth) acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth) acrylate, bisphenol A ethylene oxide (EO) adduct di(meth) acrylate, bisphenol A propylene oxide (PO) adduct di(meth) acrylate, hydroxypivalic acid neopentyl glycol di(meth) acrylate, and polytetramethylene glycol di(meth)acrylate; and trifunctional or more multifunctional (meth)acrylates, such as trimethylolpropane tri(meth)acrylate, EO-modified trimethylolpropane tri(meth)acrylate, pentaerythritol tri (meth)acrylate, pentaerythritol tetra(meth)acrylate, dipentaerythritol hexa(meth)acrylate, ditrimethylolpropane tetra (meth)acrylate, glyceryl propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

In some embodiments, dipropylene glycol diacrylate (DPGDA) is used. Such a multifunctional (meth)acrylate tends to improve curability and rub resistance and reduce the viscosity of the ink.

The multifunctional (meth)acrylate content of the first radiation-curable ink may be 2.5% to 17.5% by mass, for example, 5.0% to 15% by mass or 7.5% to 12.5% by mass, relative to the total mass of the ink. The ink containing such an amount of multifunctional (meth)acrylate tends to exhibit improved curability and reduced viscosity.

(2) Polymerization Initiator

The polymerization initiator is a photopolymerization initiator that produces active species when irradiated with radiation and is not otherwise limited. The polymerization initiator may be selected from known polymerization initiators such as acylphosphine oxide-based polymerization initiators, alkylphenone-based polymerization initiators, titanocene-based polymerization initiators, and thioxanthone-based polymerization initiators. In some embodiments, an acylphosphine oxide-based polymerization initiator or a thioxanthone-based polymerization initiator may be used, particularly an acylphosphine oxide-based polymerization initiator. Such a polymerization initiator tends to improve the curability of the first radiation-curable ink. A polymerization initiator may be used independently, or two or more polymerization initiators may be used in combination.

The polymerization initiator content of the first radiation-curable ink may be 2.5% to 17.5% by mass relative to the total mass of the ink and is, in some embodiments, 5% to 15% by mass or 7.5% to 12.5% by mass. The ink containing such an amount of polymerization initiator tends to exhibit improved curability.

Examples of acylphosphine oxide-based polymerization initiators include, but are not limited to, 2,4,6-trimethylbenzoyldiphenylphosphine oxide, bis(2,4,6-trimethylbenzoyl) phenylphosphine oxide, and bis(2,6-dimethoxybenzoyl)-2,4,4-trimethylpentylphosphine oxide.

Commercially available acylphosphine oxide-based polymerization initiators include, but are not limited to, Omnirad 819 (bis(2,4,6-trimethylbenzoyl)phenylphosphine oxide), IRGACURE 1800 (mixture of bis(2,6-dimethoxybenzoyl)-2,4,4-trimethylpentylphosphine oxide and 1-hydroxycyclohexyl phenyl ketone in a mass ratio of 25:75), and SpeedCure TPO (2,4,6-trimethylbenzoyldiphenylphosphine oxide), for example.

(3) Sensitizer

The first radiation-curable ink may further contain a sensitizer. The sensitizer may be, but is not limited to, a thioxanthone-based compound. Examples of the thioxanthone-based compound include, but are not limited to, thioxanthone, diethylthioxanthone, isopropylthioxanthone, and chlorothioxanthone.

Commercially available thioxanthone-based compounds include, but are not limited to, SpeedCure DETX (2,4-diethylthioxanthen-9-one) and SpeedCure ITX (2-isopropylthioxanthone), both produced by Lambson Group Ltd., and KAYACURE DETX-S (2,4-diethylthioxanthone) produced by Nippon Kayaku Co., Ltd.

When the first radiation-curable ink contains a sensitizer, the sensitizer content may be 0.5% to 7.5% by mass, for example, 1.5% to 5.0% by mass or 2.5% to 3.5% by mass, relative to the total mass of the ink. The ink containing such an amount of sensitizer tends to exhibit improved curability.

(4) Polymerization Inhibitor

The first radiation-curable ink may further contain a polymerization inhibitor. Examples of the polymerization inhibitor include, but are not limited to, p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds, such as 2,2,6,6-tetramethylpiperidine-1-oxyl, 2,2,6,6-tetramethyl-4-hydroxypiperidine-1-oxyl (LA-7RD), and 2,2,6,6-tetramethylpiperidine-1-oxyl derivatives.

When the first radiation-curable ink contains a polymerization inhibitor, the polymerization inhibitor content may be 0.1% to 0.7% by mass, for example, 0.2% to 0.5% by mass, relative to the total mass of the ink. The ink containing such an amount of polymerization inhibitor tends to have improved storage stability.

(5) Surfactant

The first radiation-curable ink may further contain a surfactant. The surfactant may be, but is not limited to, an acetylene glycol-based surfactant, a fluorosurfactant, or a silicone surfactant.

Examples of the acetylene glycol-based surfactant include, but are not limited to, 2,4,7,9-tetramethyl-5-decyne-4,7-diol and its alkylene oxide adducts; and 2,4-dimethyl-5-decyne-4-ol and its alkylene oxide adducts.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxides.

The silicone surfactant may be a polysiloxane compound or a polyester-modified or polyether-modified organosiloxane. Examples of the polyester-modified organosiloxane include BYK-347, BYK-348, BYK-UV 3500, BYK-UV 3510, and BYK-UV 3530 (all produced by BYK Additives & Instruments). The polyether-modified organosiloxane may be BYK-3570 (produced by BYK Additives & Instruments).

When the first radiation-curable ink contains a surfactant, the surfactant content may be 0.1% to 1.0% by mass, for example, 0.2% to 0.8% by mass, relative to the total mass of the ink. The ink containing such an amount of surfactant tends to exhibit improved wettability.

(6) Coloring Material

The first radiation-curable ink may further contain a coloring material. The ink containing a coloring material can be used as a colored ink. The coloring material may be at least a pigment or a dye. Examples of the coloring material that can be used will be cited below.

Inorganic pigments include carbon black (C.I. (Color Index Generic Name) Pigment Black 7), such as furnace black, lamp black, acetylene black, and channel black; and iron oxide and titanium oxide.

Organic pigments include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

The coloring material content of the first radiation-curable ink can be varied according to use and may be 0.5% to 15% by mass, for example, 1.0% to 10% by mass or 1.5% to 5.0% by mass, relative to the total mass of the ink. In an embodiment, the first radiation-curable ink may be a clear ink containing no coloring material or a small amount (e.g., 0.1% by mass or less) of coloring material to the extent that the coloring material is not intended for coloring.

Examples of the dye include, but are not limited to, acid dyes, such as C.I. Acid Yellows, C.I. Acid Reds, C.I. Acid Blues, C.I. Acid Oranges, C.I. Acid Violets, and C.I. Acid Blacks; basic dyes, such as C.I. Basic Yellows, C.I. Basic Reds, C.I. Basic Blues, C.I. Basic Oranges, C.I. Basic Violets, and C.I. Basic Blacks; direct dyes, such as C.I. Direct Yellows, C.I. Direct Reds, C.I. Direct Blues, C.I. Direct Oranges, C.I. Direct Violets, and C.I. Direct Blacks; reactive dyes, such as C.I. Reactive Yellows, C.I. Reactive Reds, C.I. Reactive Blues, C.I. Reactive Oranges, C.I. Reactive Violets, and C.I. Reactive Blacks; and disperse dyes, such as C.I. Disperse Yellows, C.I. Disperse Reds, C.I. Disperse Blues, C.I. Disperse Oranges, C.I. Disperse Violets, and C.I. Disperse Blacks. Such dyes may be used individually or in combination.

(7) Other Constituents

The first radiation-curable ink may optionally contain additives such as a dispersant for the coloring material or the like.

1.2.2. Printing by Ink Jet Method

The image formation with the first radiation-curable ink is performed by an ink jet method. In the ink jet method, the first radiation-curable ink is used in an apparatus that will be described below by way of example, and a shrink film, before being shrunk, is used as the printing medium.

FIG. 1 is a perspective view of a serial printer as an example of the ink jet apparatus. As depicted in FIG. 1, the serial printer 20 includes a transport section 220 and a printing section 230. The transport section 220 transports a printing medium F fed to the serial printer to the printing section 230 and, after printing, ejects the printing medium outside the serial printer. More specifically, the transport section 220 includes feed rollers that transport the printing medium F fed thereto in the sub-scanning direction T1.

The printing section 230 includes an ink jet head 231 that ejects an ink onto the printing medium F fed from the transport section 220, a radiation source 232 that applies radiation to the ink on the printing medium, a carriage 234 holding the ink jet head 231 and the radiation source 232, and a carriage transfer mechanism 235 that transfers the carriage 234 in the main scanning directions S1 and S2 in which the printing medium F is scanned.

In such a serial printer, the ink jet head 231 has a width smaller than the width of the printing medium and moves for a plurality of passes (multiple passes), thus performing printing. In the serial printer, the carriage 234, moving in the predetermined directions, holds the ink jet head 231 and the radiation source 232, and the head ejects the ink onto the printing medium while being moved by the transfer of the carriage. Thus, printing is performed by two or more passes (multiple passes) of the head. A pass is also referred to as a main scan. Between two passes, a sub-scan is performed to transport the printing medium. Main scans and sub-scans are alternately performed.

In the embodiment illustrated in FIG. 1, the carriage holds the radiation source. However, another type of radiation source not held by the carriage may be used.

The ink jet apparatus is not limited to the serial printer and, in an embodiment, may be a line printer.

1.3. Fixing Pattern Formation

In the step of fixing patter formation, a second radiation-curable ink is applied onto the shrink film on the side to come into contact with an object to be wrapped, thus forming a fixing pattern. This step is performed on the shrink film before being shrunk.

The side of the shrink film to come into contact with the object may be the side printed with the first radiation-curable ink or the side opposite to the printed side. Hence, the fixing pattern is formed on the side to come into contact with the object to be wrapped, irrespective of the presence or absence of the first radiation-curable ink.

1.3.1. Second Radiation-Curable Ink

The cured coating of the second radiation-curable ink is tackier (stickier) than that of the first radiation-curable ink. The second radiation-curable ink is the same as the first radiation-curable ink except that the amount of the monofunctional monomers described in "(1-1) Monofunctional Monomers" in "(1) Polymerizable Compounds" is higher than that of the first radiation-curable ink. Hence, the second radiation-curable ink can be understood by replacing the term "first radiation-curable ink" used in the description of "1.2.1. First Radiation-Curable Ink" with the term "second radiation-curable ink".

The proportion of monofunctional monomers in the second radiation-curable ink may be 50% by mass or more, for example, 60% by mass or more or 65% by mass or more, relative to the total mass of the polymerization compounds. The second radiation-curable ink containing such an amount of monofunctional monomers can form tackier (stickier) cured coatings. The tackiness of such a cured coating of the second radiation-curable ink enables the shrink film before being shrunk to be fixed to the object to be wrapped.

1.3.2. Ink Application

The second radiation-curable ink may be applied onto the shrink film by an ink jet method or by brushing, stamping, or the like. For an ink jet method, an ink jet apparatus may be used.

1.3.3. Fixing Pattern

Figure 2:
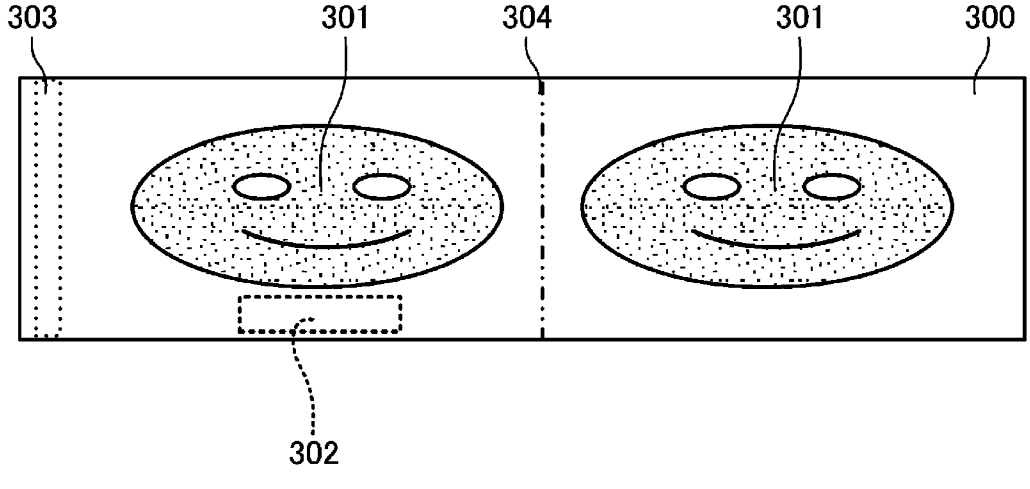
FIG. 2 is a schematic illustration of images formed on a shrink film with a first radiation-curable ink and a fixing pattern formed on the shrink film with a second radiation-curable ink.

FIG. 2 is a schematic illustration of images 301 formed on a shrink film 300 with a first radiation-curable ink and a fixing pattern 302 formed on the shrink film with a second radiation-curable ink. In the embodiment depicted in FIG. 2, the images 301 and the fixing pattern 302 are formed on the front side and the rear side of the shrink film 300, respectively.

The shrink film 300 is cut into a rectangular shape and has a bonding portion 303 near an end of the film in the longitudinal direction. The shrink film 300 is folded along a fold line 304, and the end with the bonding portion 303 and the other end are bonded together to form a ring with the side having the fixing pattern 302 on the inside.

The shrink film 300 depicted in FIG. 2 shrinks in the longitudinal direction. Accordingly, when the shrink film 300 in such a ring form is heated with an object placed within the ring, the shrink film 300 shrinks in the shrinking direction to attach and adhere to the object in such a manner as to tighten the object.

1.4. Other Steps

The printing method may further include other steps such as curing, layering, and processing.

In the curing step, at least one of the first and second radiation-curable inks attached to the shrink film is irradiated with radiation to form a cured ink coating. On irradiating ink with radiation, the polymerizable compounds start polymerization to cure the ink, thus forming a cured ink coating. At this time, the polymerization initiator, if present, produces an active species (initiation species), such as radicals, an acid, or a base. The initiation species promotes the polymerization reaction of the monomers. Additionally, a photosensitizer, if present, absorbs radiation and becomes excited. The excited photosensitizer comes into contact with the polymerization initiator to promote the decomposition of the polymerization initiator, thus promoting the curing reaction.

For irradiating the first radiation-curable ink, the radiation may be emitted from a radiation source disposed downstream of the ink jet head. In an embodiment in which the second radiation-curable ink is applied by an ink jet method, the second radiation-curable ink may also be irradiated with radiation from a radiation source disposed downstream of the ink jet head. The first and second radiation-curable inks may be irradiated at one time or separately with radiation from a radiation source disposed outside the ink jet head.

The radiation source may be, but is not limited to, an ultraviolet light emitting diode. Such a radiation source can reduce the size and cost of the apparatus. The ultraviolet light emitting diode used as the radiation source, which is small, can be incorporated into the ink jet apparatus.

In an embodiment, the printing method may further include a layering step of layering the printed shrink film such that the printed side to which the first radiation-curable ink is attached faces the other side not printed with the first radiation-curable ink. The layering step may be performed by rolling a long printed film into a roll.

Typically, printed films or sheets for industrial applications are rolled into rolls. The rolls may be stored and transported with the ink-applied printed side and the other side pressed against each other inside the roll.

The printing method may include a processing step of processing the resulting shrink film. The processing step may include, for example, cutting the printed film and bonding the printed film. Also, the processing step may include forming the printed film into a ring in a state where the second radiation-curable ink-applied side is on the inside.

The processed printed film may be stored or transported in a layered form. During storage or transport of the processed, layered printed film, the coating of the first radiation-curable ink, the coating of the second radiation-curable ink, and the surface of the shrink film may be in a state pressed against each other.

2. Wrapping Method

The wrapping method disclosed herein includes wrapping an abject with the shrink film printed by the above-described printing method.

Figure 3:
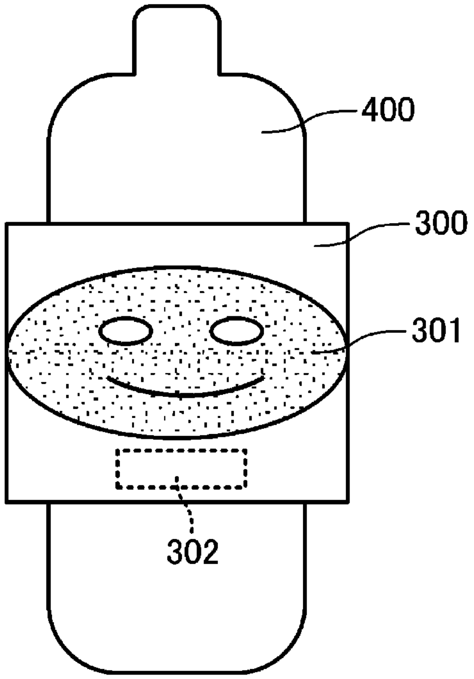
FIG. 3 is a side view of a shrink film attached to an object to be wrapped.
Figure 4:
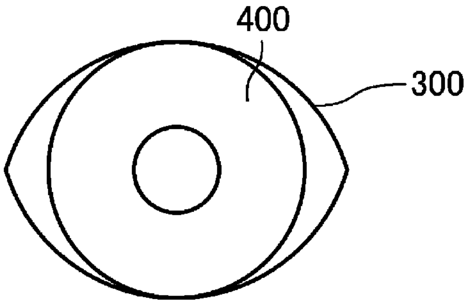
FIG. 4 is a schematic top view of a shrink film put around an object to be wrapped.

FIG. 3 is a side view of an object to which a shrink film according to an embodiment is attached. FIG. 4 is a schematic top view of a shrink film according to an embodiment put around an object to be wrapped. The shrink film in FIGS. 3 and 4 is in a state before being shrunk.

In FIGS. 3 and 4, the object to be wrapped is a PET bottle 400. The PET bottle 400 is in an upright position on a flat surface, with the shrink film 300 surrounding the PET bottle 400. When the PET bottle 400 is upright, the shrink film 300 receives the force of gravity that may cause the film to slide downward. However, the shrink film 300 disclosed herein has a fixing pattern 302 on the side contacting the PET bottle 400. The fixing pattern 302 is tacky and has an adhesion to the surface of the PET bottle 400 to reduce the likelihood that the gravity causes the shrink film to slide downward when the PET bottle 400 is upright.

The shrink film 300 is attached to the PET bottle 400 by being shrunk in a state where the PET bottle 400 and the shrink film 300 are placed as depicted in FIGS. 3 and 4, thus wrapping the PET bottle 400 with the shrink film 300.

3. Fixing Pattern

Figure 5:
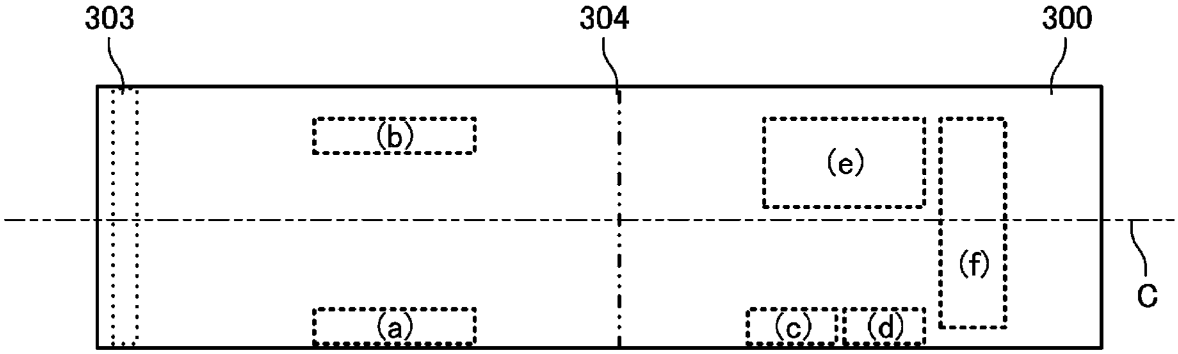
FIG. 5 is a schematic illustration of exemplary positions of a fixing pattern.

The size, the position, and the number of fixing patterns can be selected as desired, provided that the pattern is formed on the side of the shrink film 300 to come into contact with the object to be wrapped. FIG. 5 is a schematic illustration of some possible positions of the fixing pattern.

For example, one or more fixing patterns may be formed at the positions (a) to (f) in FIG. 5. Two or more of such positions may be combined. Alternatively, the fixing pattern may be formed over the entire surface on the side to come into contact with the object to be wrapped (not depicted).

The image formed of the first radiation-curable ink and the fixing pattern may be superimposed. In this instance, the second radiation-curable ink to form the fixing pattern may be a clear ink that is not likely to impair the visibility of images formed with the first radiation-curable ink.

When the object to be wrapped is placed upright, as depicted in FIG. 3, the shrink film 300 is placed in an orientation in which the film will shrink in the horizontal direction. In this instance, the fixing pattern may be formed in an area of the lower half of the shrink film 300, as at positions (a), (c), and (d) in FIG. 5. In other words, the fixing pattern may be formed below center line C parallel to the direction in which the shrink film 300 shrinks. Thus, when the shrink film 300 is shrunk, such displacement as the shrink film 300 slides down the object to be wrapped is likely to be restrained.

Figure 6:
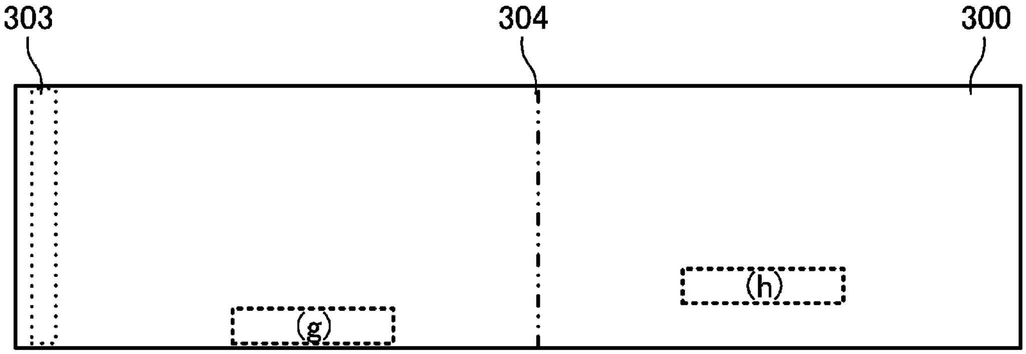
FIG. 6 is a schematic illustration of exemplary positions of the fixing pattern.
Figure 7:
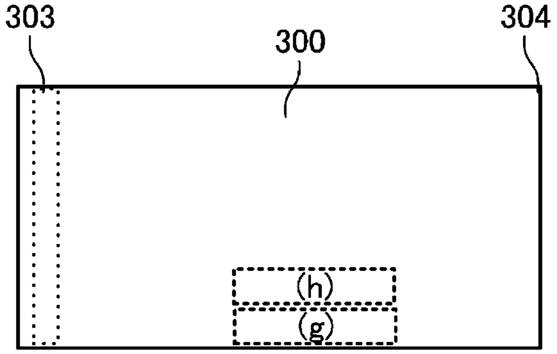
FIG. 7 is a schematic illustration of exemplary positions of the fixing pattern.

FIG. 6 schematically illustrates another example of the positions of fixing patterns. FIG. 7 schematically illustrates the shrink film 300 depicted in FIG. 6 folded along the fold line 304. In such embodiments as the shrink film 300 is folded along the fold line 304, fixing patterns may be formed so as not to overlap with each other, as depicted in FIG. 7 like (g) and (h) in FIG. 6.

This is because, for example, when the shrink film is formed into a ring with the side having the tacky (sticky) fixing patterns on the inside and is folded flat for storage or the like, the fixing patterns formed at such positions will not come into contact with each other. Thus, when the shrink film in a ring form is folded, or layered, flat for storage, the shrink film can easily be returned to the ring form, having good workability.

The fixing pattern may be printed not only in a solid pattern but also in an uneven pattern such as dots. The uneven pattern is likely to produce frictional force when contacting the object to be wrapped, further restraining the displacement of the shrink film 300.

4. Advantages

The printing method disclosed herein, in which one or more fixing patterns are formed on the side of a shrink film to come into contact with an object to be wrapped, can reduce the likelihood of misalignment between the shrink film and the object when the film is shrunk. The fixing pattern can reduce the misalignment between the shrink film and the object to be wrapped without using a jig to properly position the shrink film with respect to the object when the shrink film is shrunk. Also, when small-lot, high-mix shrink films are used, jigs need not be required for each type of shrink film. Accordingly, the step of, for example, setting a jig for shrinking may be reduced to reduce the number of steps.

Figure 8:
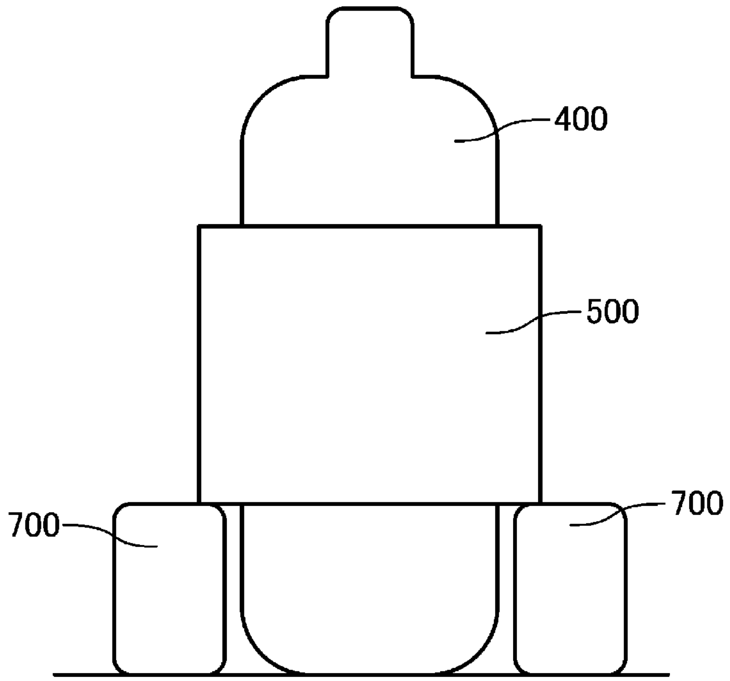
FIG. 8 is a schematic side view of a known shrink film put around an object to be wrapped.

FIG. 8 is a schematic side view of a known shrink film put around an object to be wrapped. As depicted in FIG. 8, a known shrink film 500 is not provided with the fixing pattern. Accordingly, when the shrink film 500 is attached to a predetermined position of a PET bottle 400, a jig 700 is used. The jig 700 is prepared on a case-by-case basis according to the size of the PET bottle 400 and the position to which the shrink film 500 is attached. In contrast, in the printing method disclosed herein, when small-lot, high-mix shrink films are used, jigs need not be required for each type of shrink film. Accordingly, the step of, for example, setting a jig for shrinking may be reduced to reduce the number of steps.

Also, the wrapping method disclosed herein, in which one or more fixing pattern is formed on the side of a shrink film to come into contact with an object to be wrapped, can reduce the likelihood of misalignment between the shrink film and the object when the film is shrunk. Thus, the wrapping method enables wrapping in which the misalignment between the shrink film and the object to be wrapped is reduced without using a jig for properly positioning the shrink film with respect to the object. Also, when small-lot, high-mix shrink films are used, jigs need not be prepared for each type of shrink film. Accordingly, the step of setting a jig may be reduced to reduce the number of steps.

5. EXAMPLES

5.1. Preparation of Radiation-Curable Inks

The ingredients for each composition presented in the Table were added into a mixing tank, followed by mixing and stirring, and the mixture was filtered through a membrane filter with a pore size of 5 μm. Thus, radiation-curable inks of each Example were prepared. The resulting radiation-curable inks are each equivalent to the second radiation-curable ink described above. The values of the constituents in the Table are expressed as a percentage by mass unless otherwise noted.

TABLE

| | | Example 1 | Example 2 | Example 3 | Comparative Example |
|---|---|---|---|---|---|
| Monofunctional monomer | PEA | 35.5 | 32.5 | 25.5 | No fixing pattern formed |
| | ACMO | 35 | 32 | 25 | |
| Multifunctional monomer | VEEA | 9 | 15 | 20 | |
| | DPGDA | 6 | 6 | 15 | |
| Initiator | Irgacure 819 | 6 | 6 | 6 | |
| | TPO | 4.3 | 4.3 | 4.3 | |
| | DETX | 4 | 4 | 4 | |
| Polymerization inhibitor | MEHQ | 0.2 | 0.2 | 0.2 | |
| Total | | 100 | 100 | 100 | |
| Ratio of monofunctional monomers to total monomers | | 0.82 | 0.75 | 0.59 | |
| Rating of fixation when shrunk | | A | B | C | D |

The abbreviations and materials in the Table are as follows:
Polymerizable Compounds
Monofunctional Monomers
ACMO (acryloylmorpholine, produced by KJ Chemicals Corporation)
PEA (phenoxyethyl acrylate, produced by Osaka Organic Chemical Industry Ltd.)
Multifunctional Monomers
VEEA (2-(2-vinyloxyethoxy)ethyl acrylate, produced by Nippon Shokubai Co., Ltd.)
DPGDA (dipropylene glycol diacrylate, produced by Sartomer)
Polymerization Initiator
Irgacure 819 (currently named Omnirad 819, bis(2,4,6-trimethylbenzoyl)phenylphosphine oxide, produced by IGM Resins)
TPO (Omnirad TPO, 2,4,6-trimethylbenzoyldiphenylphosphine oxide, produced by IGM Resins)
DETX (KAYACURE DETX-S, 2,4-diethylthioxanthone, produced by Nippon Kayaku Co., Ltd.)
Polymerization Inhibitor
MEHQ (hydroquinone monomethyl ether, available as p-Methoxyphenol (product name) produced by Kanto Chemical Co., Inc.)

Separately, the following ingredients were added into a mixing tank in their respective amounts, followed by mixing and stirring, and the mixture was filtered through a membrane filter with a pore size of 5 μm to yield a radiation-curable ink. The resulting radiation-curable ink corresponds to the first radiation-curable ink described above.

PEA (20% by mass)
ACMO (19% by mass)
VEEA (26% by mass)
DPGDA (16% by mass)
Irgacure 819 (6% by mass)
TPO (4.3% by mass)
DETX (4% by mass)
MEHQ (0.2% by mass)
BYK-UV 3500 (0.5% by mass, slipping agent)
Carbon black (3% by mass, coloring material)
Solsperse 36000 (1% by mass, dispersant)

The resulting ink contains monofunctional monomers in a ratio of 0.48 to all monomers.

Surfactant

BYK-UV 3500 (silicone surfactant, produced by BYK Additives & Instruments)

Dispersion Liquid

Dispersant: Solsperse 36000 (polymer dispersant produced by Lubrizol Corporation)

5.2. Evaluation

PET-G (50 μm-thick glycol-modified polyethylene terephthalate, manufactured by Bonset America Corporation) was prepared as the shrink film. A test pattern was printed with the radiation-curable ink containing the coloring material on one side of the shrink film by an ink jet method.

Subsequently, for each Example, a fixing pattern was formed with the radiation-curable ink containing no coloring material by an ink jet method to fill a 20 mm by 5 mm area on the other side of the shrink film. For the Comparative Example, the fixing pattern was not formed. Each shrink film was formed into a ring form with the fixing pattern facing inward.

Figure 9:
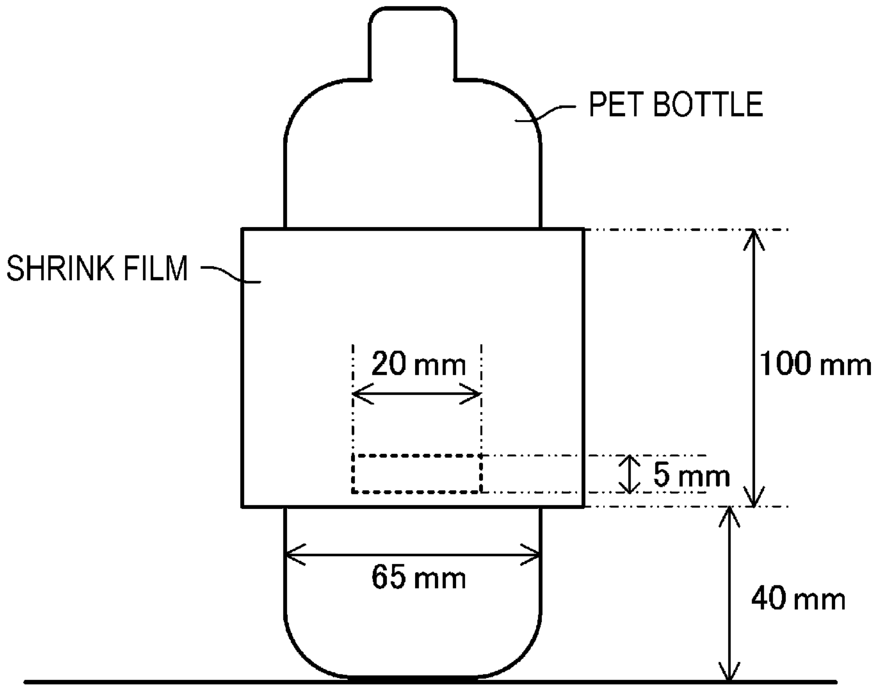
FIG. 9 is a schematic diagram of the dimensions of the sample used in the Examples.

FIG. 9 schematically depicts a sample used for evaluation tests. In each Example, the shrink film is placed such that the fixing pattern could adhere to a 500 mL-cylindrical PET bottle (210 mm in height, 65 mm in diameter), as seen in FIG. 9, and the behavior of the shrink film was observed and evaluated according to the following criteria:

A: The shrink film did not drop from the shrink film even more than 1 min elapsed.

B: The shrink film dropped from the shrink film in the time range of more than 20 s to 1 min.

C: The shrink film dropped within 20 s.

D: The shrink film did not adhere to the PET bottle.

The above-described embodiments, Examples, and modifications are merely examples and do not limit the implementation of the disclosure. For example, an embodiment of the disclosure may be combined with another embodiment or Example.

The subject matter disclosed herein can be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

The following can be derived from the above-described embodiments and modifications.

The printing method is used for printing a shrink film with radiation-curable ink. The printing method includes forming an image on the shrink film with a first radiation-curable ink by an ink jet method, and forming a fixing pattern by applying a second radiation-curable ink onto a surface of the shrink film that is to come into contact with an object to be wrapped with the shrink film.

The printing method, in which a fixing pattern is formed on the side of a shrink film to come into contact with an object to be wrapped, can reduce the likelihood of misalignment between the shrink film and the object when the film is shrunk. Thus, the fixing pattern can reduce the misalignment between the shrink film and the object to be wrapped without using a jig to properly position the shrink film with respect to the object when the shrink film is shrunk. Also, when small-lot, high-mix shrink films are used, jigs need not be prepared for each type of shrink film. Accordingly, the step of setting a jig or the like in shrinking may be reduced to reduce the number of steps.

In an embodiment of the printing method, the second radiation-curable ink may be clear ink.

The fixing pattern formed with the clear ink is less likely to affect, for example, the visibility of the image of the first radiation-curable ink.

In the printing method, the fixing pattern may be formed such that when the shrink film is placed in an orientation in which the film shrinks in the horizontal direction, the fixing pattern is located in an area of the lower half of the shrink film.

In this embodiment, when the shrink film is shrunk, such displacement as the shrink film slides down the object to be wrapped with the shrink film is likely to be restrained.

In an embodiment of the printing method, the second radiation-curable ink may contain one or more monofunctional polymerizable compounds in a proportion of 60% by mass or more to the total mass of polymerizable compounds contained in the ink.

Such a second radiation-curable ink, having relatively high monofunctional polymerizable compound content, exhibits higher adhesion to the object to be wrapped with the shrink film and, accordingly, enhances the effect of reducing the displacement of the shrink film when shrunk.

In an embodiment of the printing method, the first radiation-curable ink may contain one or more multifunctional polymerizable compounds in a proportion of 50% by mass or more to the total mass of polymerizable compounds contained in the ink.

Such a first radiation-curable ink, having relatively high multifunctional polymerizable compound content, reduces undesired blocking of first-radiation curable ink coatings.

The wrapping method includes wrapping an abject with the shrink film printed by the above-described printing method.

The wrapping method, in which the fixing pattern is located on the side of the shrink film to come into contact with an object to be wrapped, can reduce the likelihood of the misalignment between the shrink film and the object when the film is shrunk. Thus, the wrapping method enables wrapping in which the misalignment between the shrink film and the object to be wrapped is reduced without using a jig for properly positioning the shrink film with respect to the object. Also, when small-lot, high-mix shrink films are used, jigs need not be prepared for each type of shrink film. Accordingly, the step of setting a jig may be reduced to reduce the number of steps.

What is claimed is:

1. A printing method for printing a shrink film with radiation-curable ink, the method comprising:

forming an image on the shrink film with a first radiation-curable ink by an ink jet method; and forming a fixing pattern by applying a second radiation-curable ink onto a surface of the shrink film that is to come into contact with an object to be wrapped with the shrink film, bonding a first end of the shrink film to an opposite second end in a bonding region of the shrink film to form a ring;

locating the ring over the object to be wrapped and adhering the fixing pattern to the object to be wrapped to secure the shrink film to the object to be wrapped without using a jig; and applying heat to the shrink film to shrink-wrap the shrink film to the object to be wrapped, wherein the first radiation-curable ink includes a polymerization initiator, and the polymerization initiator includes at least one of 2,4,6-trimethylbenzoyldiphenylphosphine oxide, bis(2,4,6-trimethylbenzoyl) phenylphosphine oxide, bis(2,6-dimethoxybenzoyl)-2,4,4-trimethylpentylphosphine oxide, 2,4-diethylthioxanthen-9-one, 2-isopropylthioxanthone and 2,4-diethylthioxanthone.

2. The printing method according to claim 1, wherein the second radiation-curable ink is a clear ink.

3. The printing method according to claim 1, wherein the fixing pattern is formed such that when the shrink film is placed in an orientation in which the shrink film shrinks in the horizontal direction, the fixing pattern is in an area of the lower half of the shrink film.

4. The printing method according to claim 1, wherein the second radiation-curable ink contains one or more monofunctional polymerizable compounds in a proportion of 60% by mass or more to the total mass of polymerizable compounds contained in the second radiation-curable ink.

5. The printing method according to claim 1, wherein the first radiation-curable ink contains one or more multifunctional polymerizable compounds in a proportion of 50% by mass or more to the total mass of polymerizable compounds contained in the first radiation-curable ink.

6. The printing method according to claim 1, wherein the second radiation-curable ink includes at least one of acryloylmorpholine and phenoxyethyl acrylate.

* * * * *